(12) United States Patent
Gopshtein et al.

(10) Patent No.: US 10,346,631 B2
(45) Date of Patent: Jul. 9, 2019

(54) METRICS AUTHORIZATION BASED ON A CERTIFICATE (71) Applicant: HEWLETT PACKARD ENTERPRISE DEVELOPMENT LP, Houston, TX (US)

(72) Inventors: Michael Gopshtein, Yehud (IL); Eyal Kenigsberg, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 116 days.

(21) Appl. No.: 15/512,929

(22) PCT Filed: Sep. 30, 2014

(86) PCT No.: PCT/US2014/058174
§ 371 (c)(1),
(2) Date: Mar. 21, 2017

(87) PCT Pub. No.: WO2016/053265
PCT Pub. Date: Apr. 7, 2016

(65) Prior Publication Data
US 2017/0300708 A1 Oct. 19, 2017

(51) Int. Cl.
*H04L 9/32* (2006.01)
*G06F 11/30* (2006.01)
(Continued)

(52) U.S. Cl.
CPC ........ *G06F 21/6218* (2013.01); *G06F 11/302* (2013.01); *G06F 11/3409* (2013.01);
(Continued)

(58) Field of Classification Search
CPC ............... G06F 21/6218; G06F 11/302; G06F 11/3409; G06F 21/31; G06F 21/6209;
(Continued)

(56) References Cited

U.S. PATENT DOCUMENTS 8,327,441 B2 * 12/2012 Kumar ................... G06F 21/57
726/22
8,589,691 B1 11/2013 Hackborn et al.
(Continued)

FOREIGN PATENT DOCUMENTS

EP 2107490 A2 10/2009
WO WO-2011050482 5/2011

OTHER PUBLICATIONS

Apple, Inc.; Maintaining Your Signing Identities and Certificates; https://developer.apple.com/library/mac/Documentation/IDEs/Conceptual/AppDistributionGuide/MaintainingCertificates/MaintainingCertificates.html; Copyright 2014; Retrieved May 29, 2015; 11 pages.

(Continued)

*Primary Examiner* — Michael Pyzocha
*Assistant Examiner* — Zoha Piyadehghibi Tafaghodi (57) ABSTRACT In one implementation, a system can include a tenant engine to maintain a plurality of tenant profiles with access to a first set of metrics of a plurality of metrics based on authorization via a certificate, a metrics engine to maintain a plurality of metrics derived from instrumentation of a plurality of applications, and a report engine to provide the first set of metrics in response to a report request when the report request is from a user associated with a first tenant profile of the plurality of tenant profiles and the first tenant profile is authorized to access the first set of metrics based on the certificate associated with a private key used to sign a first application of the plurality of applications.

15 Claims, 6 Drawing Sheets (51) Int. Cl.
*G06F 11/34* (2006.01)
*G06F 21/31* (2013.01)
*G06F 21/62* (2013.01)
*G06F 21/64* (2013.01)
*H04L 29/06* (2006.01)
*H04L 29/08* (2006.01)

(52) U.S. Cl.
CPC .......... *G06F 21/31* (2013.01); *G06F 21/6209* (2013.01); *G06F 21/64* (2013.01); *H04L 9/3263* (2013.01); *H04L 63/0823* (2013.01); *H04L 63/102* (2013.01); *H04L 67/02* (2013.01); *H04L 67/306* (2013.01); *G06F 11/3466* (2013.01); *G06F 2201/865* (2013.01)

(58) Field of Classification Search
CPC ................ G06F 21/64; G06F 11/3466; G06F 2201/865; H04L 9/3263; H04L 63/0823; H04L 63/102; H04L 67/02; H04L 67/306
USPC .......................................................... 726/19
See application file for complete search history.

(56) References Cited

U.S. PATENT DOCUMENTS

| | | | |
|---|---|---|---|
| 8,769,644 | B1 | 7/2014 | Eicken et al. |
| 9,215,231 | B1* | 12/2015 | Bowen ................ H04L 63/1416 |
| 2006/0093149 | A1 | 5/2006 | Zhu et al. |
| 2010/0077449 | A1 | 3/2010 | Kwok et al. |
| 2012/0166818 | A1 | 6/2012 | Orsini et al. |
| 2012/0179907 | A1 | 7/2012 | Byrd et al. |
| 2012/0216244 | A1* | 8/2012 | Kumar .................... G06F 21/31 726/1 |
| 2013/0132717 | A1 | 5/2013 | Brand et al. |
| 2014/0019756 | A1 | 1/2014 | Krajec |
| 2014/0075565 | A1 | 3/2014 | Srinivasan et al. |
| 2014/0150120 | A1 | 5/2014 | Orsini et al. |
| 2014/0228001 | A1 | 8/2014 | Kulkarni |
| 2015/0222604 | A1* | 8/2015 | Ylonen ................ H04L 63/062 713/171 |
| 2017/0262294 | A1* | 9/2017 | Yakan .................... G06F 3/0481 |

OTHER PUBLICATIONS

Gartner; SOA Governance and API Management Markets Merging; http://www.itbusinessedge.com/blogs/integration/gartner-soa-governance-and-api-management-markets-merging.html; Retrieved Mar. 21, 2017; 7 pages.

International Searching Authority, The International Search Report and the Written Opinion, dated May 29, 2015, 12 Pages.

Extended European Search Report; 14903336.7-1213 / 3202081; PCT/US2014/058174; dated May 2, 2018; 6 pages.

Welderufael Berhane Tesfay et al., "Reputation Based Security Model for Android Applications", 2012 IEEE 11th International Conference on Trust, Security and Privacy in Computing and Communications (Trustcom), IEEE, Jun. 25, 2012, pp. 896-901.

* cited by examiner

METRICS AUTHORIZATION BASED ON A CERTIFICATE

BACKGROUND

Applications are commonly instrumented to take measurements of the applications performance. For example, a library can execute in the background of an application and monitor events on a device, such as user interactions, network events, sensor data, and the like. Access to performance statistics of an application can allow for an organization to find errors and identify improvements for the application.

DETAILED DESCRIPTION

In the following description and figures, some example implementations of apparatus, systems, and/or methods for regulating access to a metrics report are described. Access to instrumentation should be regulated to owners of the application and/or persons authorized by the owner. For example, one way to associate an authorized user with instrumentation information is through a registration process to create an account with a username and password combination and providing access to the instrumentation information to particular accounts.

Application owners commonly generate a private key and public key as a pair to certify the identity of the owner of the application. An owner of the application can certify ownership upon uploading the application to an application store by signing the application using a certificate based on the private key. The signature can be derived from a private key to certify the identity of the owner of the signature. In this manner, a person can prove the ownership of the application by providing the private key, which is to be kept secure from disclosure. For example, an update to the application can be authorized to be uploaded based on the signature using a secure protocol, such as a transport security handshake over secure socket layer ("SSL") and/or using transport layer security ("TLS").

Various examples described below relate to regulating access to a metrics report based on a certificate to prove authorization to access the metrics. The data can be collected using instrumentation that can identify the application, such as using a bundle identifier. As part of the data collection, a public certificate of the application can be stored. The data can be made accessible using secure hypertext transfer protocol ("HTTPS") with client certificates and, upon receiving a certificate from a user, the data associated with users certificate can be provided. In this manner, the application owner can provide a certificate based on the private key used to sign the application and data can be provided that is associated with applications authorized by the certificate.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus. Furthermore, the term "maintain" (and variations thereof) as used herein means "to create, delete, add, remove, access, update, organize, and/or modify."

Figure 1:
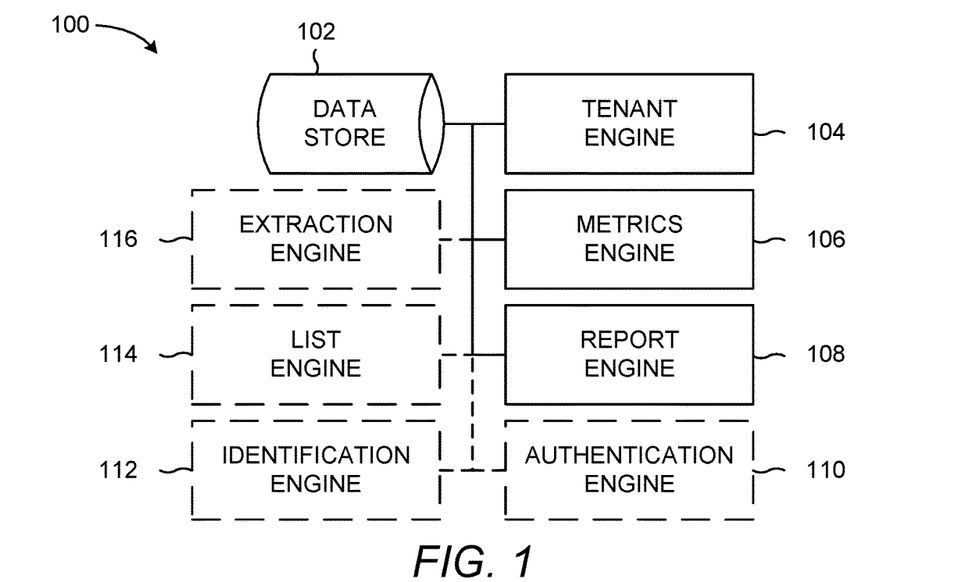
FIGS. 1 and 2 are block diagrams depicting example systems for regulating access to a metrics report.
Figure 2:
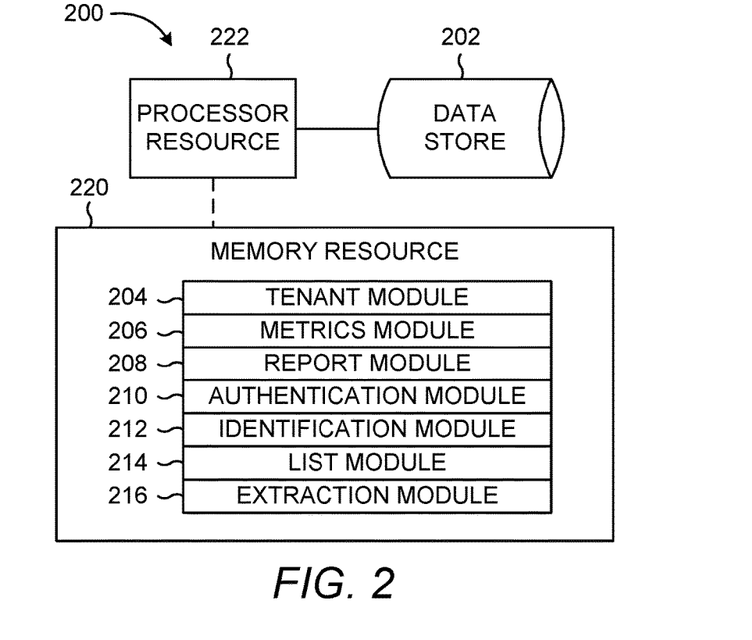

FIGS. 1 and 2 are block diagrams depicting example systems 100 and 200 for regulating access to a metrics report. Referring to FIG. 1, the example system 100 of FIG. 1 generally includes a data store 102, a tenant engine 104, a metrics engine 108, and a report engine 108. In general, the report engine 108 provides a metric report based on metric information maintained by the metrics engine 106 to an authorized user based on a certificate of the user via the tenant engine 104 that maintains tenant profiles that designate applications for which a user has access based on the certificate. A metric report represents any appropriate communication comprising a metric associated with an application, such as network transmission having a metric as a payload, a web page dashboard to display a metric, or a file having a metric of an application. The example system 100 can include an authentication engine 110, an identification engine 112, a list engine 114, and an extraction engine 116 to facilitate regulation of access to the metrics and organization of the metrics based on the applications.

The tenant engine 104 represents any circuitry or combination of circuitry and executable instructions to maintain a plurality of tenant profiles based on certificate authorization. For example, the tenant engine 104 can be a combination of circuitry and executable instructions to maintain a plurality of tenant profiles with access to a first set of metrics of a plurality of metrics based on authorization via a certificate. A certificate is a document that provides information to prove an identity and authorization. A certificate can be derived from a private key to prove authorization. For example, a certificate can be derived from a private key and include a public key, user information, and/or other combination of identifiable information. An example of a certificate is an X.509 certificate.

The tenant engine 104 can maintain a tenant database to store tenant profiles. For example, the tenant database can comprise registered tenant profiles of each tenant of the system 100, such as a multi-tenant system, and users associated with each tenant. The tenant database can be maintained based on registration of tenant profiles that allow automatic identification of a tenant based on a public key of a certificate. For example, the tenant engine 104 can add a tenant and an application to a database when the database does not already include the public key associated with the application. For example, the database can include a map (e.g., a data structure comprising key-value pairs) of applications to tenants and/or tenant profiles and if a new application is being instrumented, the public key for the new application can be identified and added to the map.

The tenant engine 104 can receive a report request for a set of metrics associated with an application from a tenant authorized to access the set of metrics. The authorization can be made based on a comparison between a certificate of the tenant and the private key used to sign the application.

A first set of metrics of a plurality of metrics can be associated with a first application of a plurality of applications based on a bundle identifier associated with the first application. A bundle identifier is a unique identifier that is particular to an application for distribution of the application, such as a unique identifier associated with an application by an application store. A bundle identifier can be a number, a category, a string, or other data structure that can represent a unique value. For example, a bundle identifier can be "com.devteam.projectname," which can uniquely identify the application "projectname" and allow for instrumentation information to be associated with the application.

The metrics engine 106 represents any circuitry or combination of circuitry and executable instructions to maintain a plurality of metrics derived from instrumentation of the plurality of applications. A metric can include any form of measurable data including a number, a character, a string, and the like. The metrics can be obtained via instrumentation and/or analysis thereof. The metrics engine 108 can store the information obtained via instrumentation and regulate access to the data collected via instrumentation. For example, the first set of metrics can be restricted from access based on a public key associated with a private key used to sign the first application.

The metrics engine 106 can maintain the database of metrics based on application information captured via instrumentation of an application. For example, a first application of a plurality of applications can be instrumented to provide application information to a database that is organized based on the plurality of application. An instrument tool can be used to instrument the application. For example, an instrument tool can be used to instrument the application based on the bundle identifier to organize the database of metrics. The instrument tool can be used to instrument the application using the bundle identifier to associate the collected data with a public key from the signature of the application from which data is collected.

The database maintained by the metrics engine 108 can include a map between the plurality of metrics and the plurality of applications. Actions can be caused to perform on the application to cause instrumentation to create measurements to place in a metric database. The measurements associated with the application can be captured by the instrumentation and stored based on the public key and/or bundle identifier. The captured measurements can be used as metrics (or used to derive metrics) to place (e.g., store) in the database for retrieval by the application owner.

The report engine 108 represents any circuitry or combination of circuitry and executable instructions to provide metrics based on a certificate associated with an application for which a set of metrics is stored. For example, the report engine 106 can be a combination of circuitry and executable instructions associated with a first application of a plurality of applications in response to a report request when the report request originates from a user associated with a first tenant profile of the plurality of tenant profiles and the first tenant profile is authorized to access the first set of metrics based on the certificate. The report engine can provide a set of metrics, such as from a database, when the certificate derived from the private key used to sign the application identifies the tenant with authorization to access the set of metrics.

The report engine 108 can generate a report based on the metrics associated with an application and authorized for view by the tenant. For example, the report can include a set of metrics for each application authorized for the tenant to access. For another example, a user can select a category of reports to generate. Example categories of reports based on metrics of the database includes user comment analysis, application performance, application stability, application usability, static code analysis, and security analysis.

The authentication engine 110 represents any circuitry or combination of circuitry and executable instructions to receive the certificate and authenticate the certificate. For example, the authentication engine 110 can represent a combination of circuitry and executable instructions that receive the certificate containing the public key and user information, and a combination of the public key and user information can be used to authenticate the user providing the certificate. The certificate can be received in a secure manner. For example, the certificate can be received via HTTPS. The certificate can include information to prove identity and/or authorization for the entity providing the certificate. For example, the certificate can include and/or be derived from a public key and private key pair used to sign the application.

The identification engine 112 represents any circuitry or combination of circuitry and executable instructions to identify the tenant profile of a tenant authorized by the certificate. For example, the identification engine 112 can represent a combination of circuitry and executable instructions that use the public key and the user information to identify which tenant is associated with the certificate and identify the tenant profile associated with the tenant that is authorized by the certificate. The identification engine 112 can identify and authorize a report request using additional information. For example, the identification engine 112 can authorize a user to retrieve a set of metrics via the report engine 108 based on the user information of the certificate.

The list engine 114 represents any circuitry or combination of circuitry and executable instructions to provide the plurality of applications associated with the tenant when the tenant is authenticated via the certificate. For example, the list engine 114 can represent a combination of circuitry and executable instructions to provide a list of applications associated with the certificate that have metrics in the metrics database. For another example, the tenant profile can be associated with an array of application for which the associated tenant is authorized to access.

The extraction engine 116 represents any circuitry or combination of circuitry and executable instructions to extract the public key from the signature of an application. For example, the extraction engine 116 can represent a combination of circuitry and executable instructions that retrieve the application file of the application once downloaded, retrieve the signature of the application file, and identify the public key of the signature. The extraction engine 116 can extract the public key to identify the bundle identifier to which the metrics should be associated. In this manner, the system 100 can avoid using a separate application key, and organize the data collected by the bundle identifier uniquely associated with the application based on the public key. The extraction engine 116 can extract the public key from the signature of the application when the application files is downloaded by parsing the signature data structure for identifiable information such as the public key.

The data store 102 can contain information utilized by the engines 104, 106, 108, 110, 112, 114, and 118. For example, the data store 102 can store the tenant database, the application database, the metrics database, a certificate, a key, a bundle identifier, a metric, and the like (or location thereof).

FIG. 2 depicts the example system 200 can comprise a memory resource 220 operatively coupled to a processor resource 222. The processor resource 222 can be operatively coupled to a data store 202. The data store 202 can be the same as the data store 102 of FIG. 1.

Referring to FIG. 2, the memory resource 220 can contain a set of instructions that are executable by the processor resource 222. The set of instructions are operable to cause the processor resource 222 to perform operations of the system 200 when the set of instructions are executed by the processor resource 222. The set of instructions stored on the memory resource 220 can be represented as a tenant module 204, a metrics module 208, a report module 208, an authentication module 210, an identification module 212, a list module 214, and an extraction engine 218. The tenant module 204, the metrics module 206, the report module 208, the authentication module 210, the identification module 212, the list module 214, and the extraction engine 218 represent program instructions that when executed function as the tenant engine 104, the metrics engine 108, the report engine 108, the authentication engine 110, the identification engine 112, the list engine 114, and the extraction engine 118 of FIG. 1, respectively. The processor resource 222 can carry out the modules 204, 206, 208, 210, 212, 214, and 216 and/or any other appropriate operations among and/or associated with the modules of the system 200. For example, the processor resource 222 can carry out a set of instructions to maintain a first database of metrics based on application information captured via instrumentation of a first application of a plurality of applications, receive a report request for a set of metrics associated with the first application from a tenant authorized to access the set of metrics based on a comparison between a certificate of the tenant and the private key used to sign the first application, and provide the set of metrics from the first database when the certificate derived from the private key used to sign the application identifies the tenant with authorization to access the set of metrics. For another example, the processor resource 222 can carry out a set of instructions to instrument an application with instrumentation code to cause the processor resource to generate measurements of the application, cause actions to perform on the application to cause the instrumentation code to generate the measurements, and store the measurements associated with the application in a database based on a bundle identifier (and/or public key) and the instrumentation code. For another example, the processor resource 222 can carry out a set of instructions to download an application based on a criteria, extract a public key from the signature of the application, create a tenant profile for the public key, add the application to the tenant profile, inject program code into the application to collect data of the application in a database organized based on the bundle identifier, and report metrics tagged with the bundle identifier when requested by an authorized user based on a certificate having a public key associated with the extracted public key.

Figure 5:
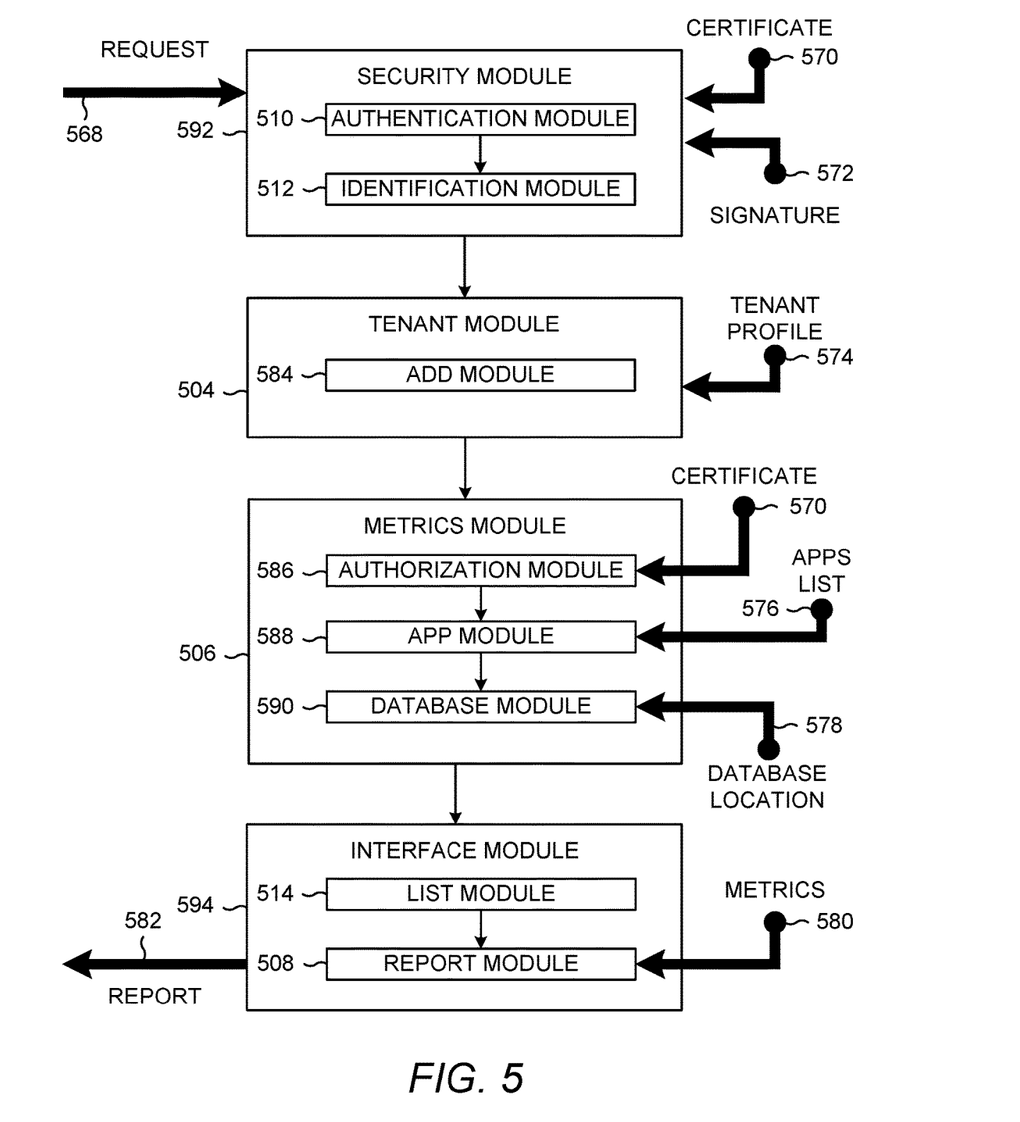
FIG. 5 depicts example modules used to implement example system for regulating access to a metrics report.

Although these particular modules and various other modules are illustrated and discussed in relation to FIG. 2 and other example implementations, other combinations or sub-combinations of modules can be included within other implementations. Said differently, although the modules illustrated in FIG. 2 and discussed in other example implementations perform specific functionalities in the examples discussed herein, these and other functionalities can be accomplished, implemented, or realized at different modules or at combinations of modules. For example, two or more modules illustrated and/or discussed as separate can be combined info a module that performs the functionalities discussed in relation to the two modules. As another example, functionalities performed at one module as discussed in relation to these examples can be performed at a different module or different modules. FIG. 5 depicts yet another example of how functionality can be organized into modules.

The processor resource 222 can be any appropriate circuitry capable of processing (e.g., computing) instructions, such as one or multiple processing elements capable of retrieving instructions from the memory resource 220 and executing those instructions. For example, the processor resource 222 can be a central processing unit ("CPU") that enables regulating access to a metrics report by fetching, decoding, and executing modules 204, 208, 208, 210, 212, 214, and 216. Example processor resources 222 include at least one CPU, a semiconductor-based microprocessor, an application specific integrated circuit ("ASIC"), a field-programmable gate array ("FPGA"), and the like. The processor resource 222 can include multiple processing elements that are integrated in a single device or distributed across devices. The processor resource 222 can process the instructions serially, concurrently, or in partial concurrence.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine-readable, such as computer-readable. The medium can be an electronic, magnetic, optical, or other physical storage device that is capable of containing (i.e., storing) executable instructions. The memory resource 220 can be said to store program instructions that when executed by the processor resource 222 cause the processor resource 222 to implement functionality of the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein.

In the discussion herein, the engines 104, 108, 108, 110, 112, 114, and 116 of FIG. 1 and the modules 204, 206, 208, 210, 212, 214, and 216 of FIG. 2 have been described as circuitry or a combination of circuitry and executable instructions. Such components can be implemented to a number of fashions. Looking at FIG. 2, the executable instructions can be processor-executable instructions, such as program instructions, stored on the memory resource 220, which is a tangible, non-transitory computer-readable storage medium, and the circuitry can be electronic circuitry, such as processor resource 222, for executing those instructions. The instructions residing on the memory resource 220 can comprise any set of instructions to be executed directly (such as machine code) or indirectly (such as a script) by the processor resource 222.

In some examples, the system 200 can include the executable instructions can be part of an installation package that when installed can be executed by the processor resource 222 to perform operations of the system 200, such as methods described with regards to FIGS. 4-8. In that example, the memory resource 220 can be a portable medium such as a compact disc, a digital video disc, a flash drive, or memory maintained by a computer device, such as a service device 334 of FIG. 3, from which the installation package can be downloaded and installed. In another example, the executable instructions can be part of an application or applications already installed. The memory resource 220 can be a non-volatile memory resource such as read only memory ("ROM"), a volatile memory resource such as random access memory ("RAM"), a storage device, or a combination thereof. Example forms of a memory resource 220 include static RAM ("SRAM"), dynamic RAM ("DRAM"), electrically erasable programmable ROM ("EEPROM"), flash memory, or the like. The memory resource 220 can include integrated memory such as a hard drive ("HD"), a solid state drive ("SSD"), or an optical drive.

Figure 3:
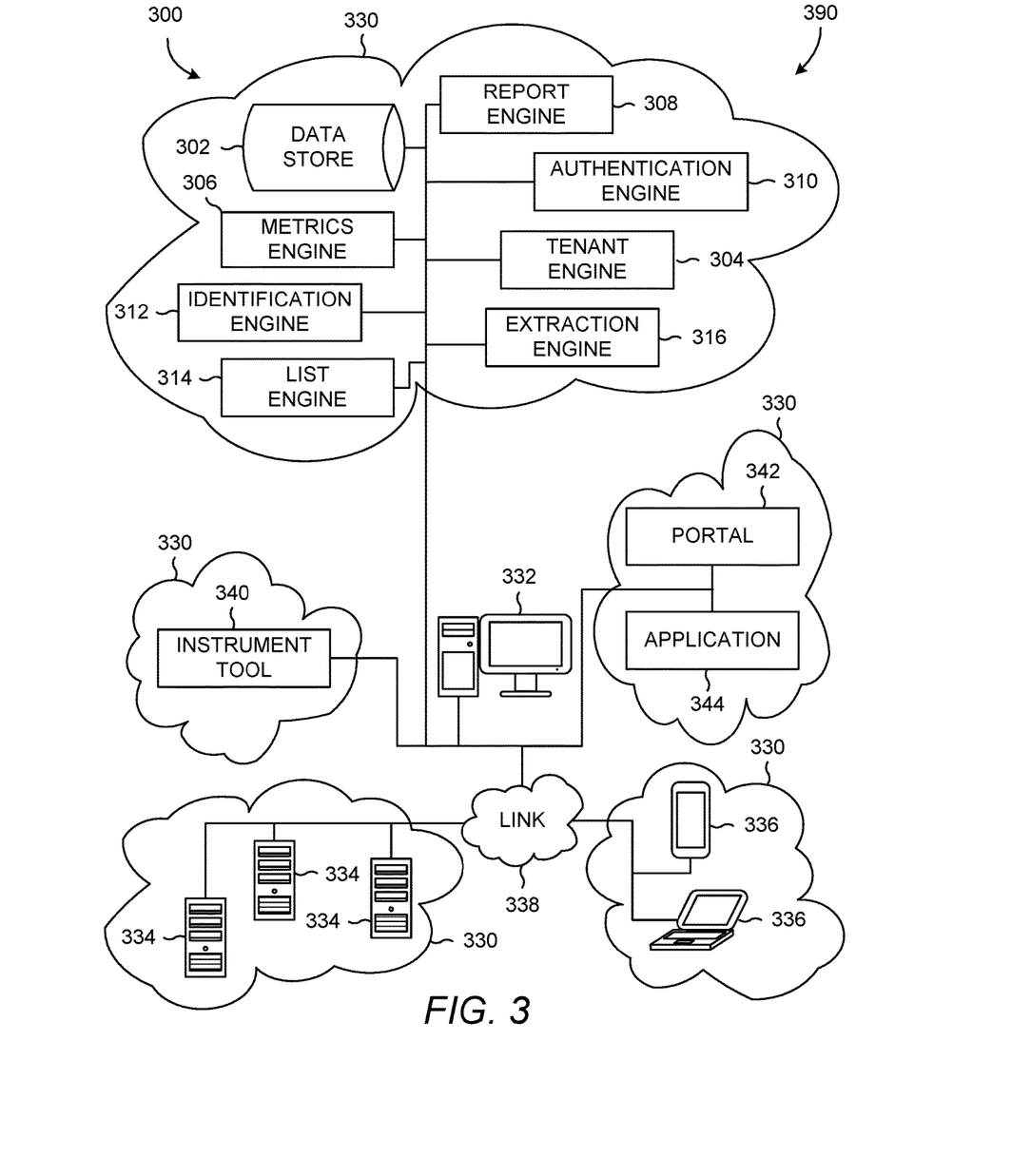
FIGS. 3 and 4 depict an example environment in which various systems for regulating access to a metrics report can be implemented.
Figure 4:
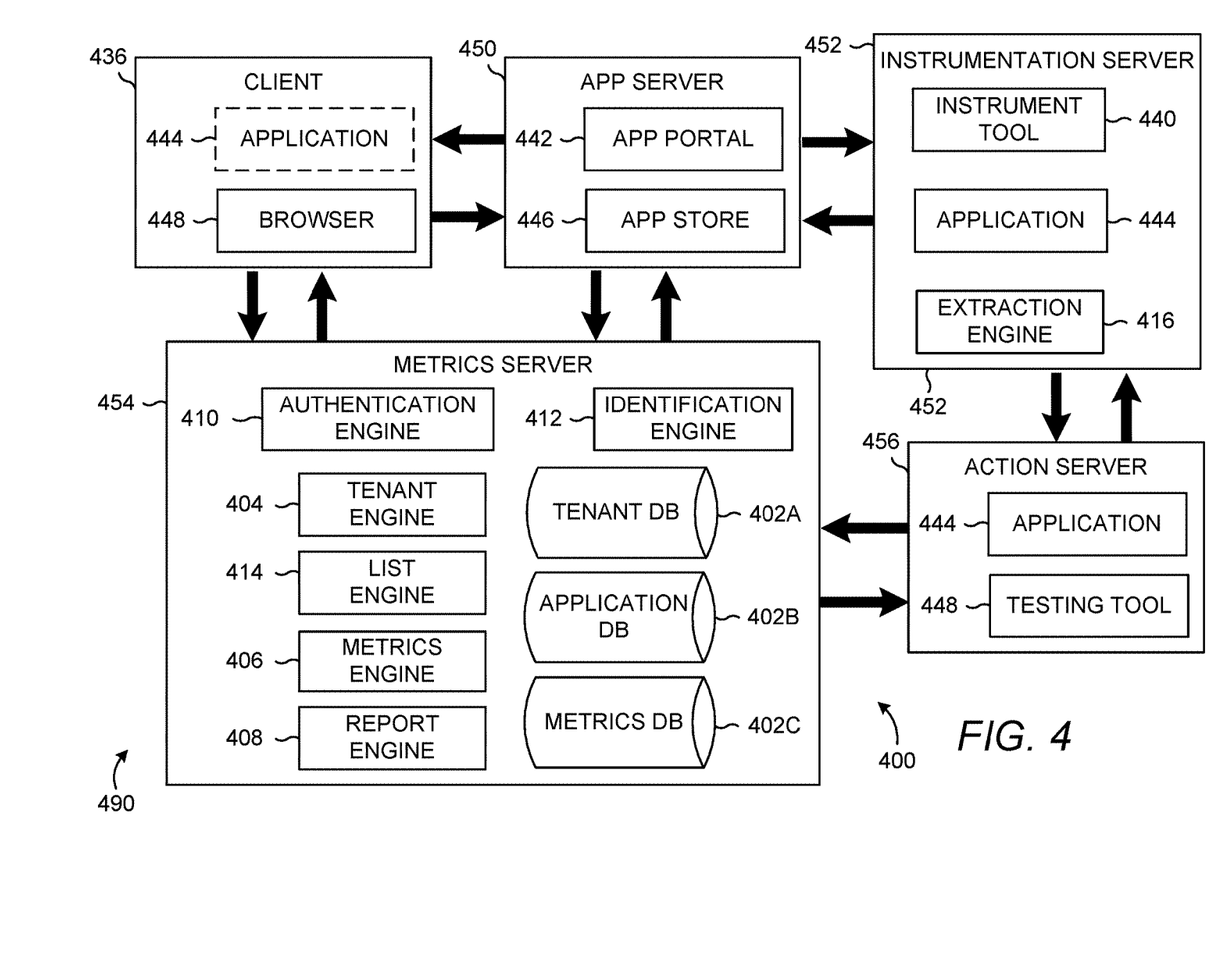

FIGS. 3 and 4 depicts example environments 390 and 490 in which various example systems 300 and 400 for regulating access to a metric report can be implemented. The example environment 390 of FIG. 3 is shown to include an example system 300. The system 300 (described herein with respect to FIGS. 1 and 2) can represent generally any circuitry or combination of circuitry and executable instructions to provide metrics based on a certificate. The system 300 can include a tenant engine 304, a metrics engine 306, a report engine 308, an authentication engine 310, an identification engine 312, a list engine 314, and an extraction engine 316 that are the same as the tenant engine 104, the metrics engine 106, the report engine 108, the authentication engine 110, the identification engine 112, the list engine 114, and the extraction engine 116 of FIG. 1, respectively, and the associated descriptions are not repeated for brevity. As shown in FIG. 3, the engines 304, 306, 308, 310, 312, 314, and 316 can be integrated into a compute device, such as a service device 334. The engines 304, 306, 308, 310, 312, 314, and 316 can be integrated via circuitry or as installed instructions into a memory resource of the compute device. The example environment 390 also includes a portal 342 to access the application 344 (and/or metrics associated with the application) and an instrument toot 340 to instrument the application 344.

The example environment 390 can include compute devices, such as developer devices 332, service devices 334, and user devices 336. A first set of instructions can be developed and/or modified on a developer device 332. For example, an application can be developed and modified on a developer device 332 and stored onto a web server, such as a service device 334. The service devices 334 represent generally any compute devices to respond to a network request received from a user device 338, whether virtual or real. For example, the service device 334 can operate a combination of circuitry and executable instructions to provide a network packet in response to a request for a page or functionality of an application. The user devices 338 represent generally any compute devices to communicate a network request and receive and/or process the corresponding responses. For example, a browser application may be installed on the user device 338 to receive the network packet from the service device 334 and utilize the payload of the packet to display an element of a page via the browser application.

The compute devices can be located on separate networks 330 or part of the same network 330. The example environment 390 can include any appropriate number of networks 330 and any number of the networks 330 can include a cloud compute environment. A cloud compute environment may include a virtual shared pool of compute resources. For example, networks 330 can be distributed networks comprising virtual computing resources. Any appropriate combination of the system 300 and compute devices can be a virtual instance of a resource of a virtual shared pool of resources. The engines and/or modules of the system 300 herein can reside and/or execute "on the cloud" (e.g. reside and/or execute on a virtual shared pool of resources).

A link 338 generally represents one or a combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, 112, 114, and 116 of FIG. 1 and/or the modules 204, 208, 208, 210, 212, 214, and 218 of FIG. 2 can be distributed across devices 332, 334, 336, or a combination thereof. The engine and/or modules can complete or assist completion of operations performed in describing another engine and/or module. For example, the report engine 308 of FIG. 3 can request, complete, or perform the methods or operations described with the report engine 108 of FIG. 1 as well as the tenant engine 104, the metrics engine 106, and the identification engine 112 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 can perform example methods described in connection with FIGS. 4-8.

Referring to FIG. 4, the example environment 490 is shown to include an example system 400. The system 400 (described herein with respect to FIGS. 1 and 2) can represent generally any circuitry or combination of circuitry and executable instructions to provide metrics based on a certificate. The system 400 includes a client device 438 (which is the same as client device 336 of FIG. 3) and plurality of service devices (referred to as service devices 334 in FIG. 3) including a metric server 454, an app server 450, an instrumentation server 452, and an action server 458.

FIG. 4 depicts a tenant engine 404, a metrics engine 408, a report engine 408, an authentication engine 410, an identification engine 412, and a list engine 414 to be located on a metrics server 454 and an extraction engine 416 on an instrumentation server 452. The tenant engine 404, the metrics engine 406, the report engine 408, the authentication engine 410, the identification engine 412, the list engine 414, and the extraction engine 416 that are the same as the tenant engine 104, the metrics engine 108, the report engine 108, the authentication engine 110, the identification engine 112, the list engine 114, and the extraction engine 118 of FIG. 1, respectively, and the associated descriptions are not repeated for brevity. The example metrics server 454 includes a tenant database 402A, an application database 402B, and a metrics database 402C that are represented as separate databases. Alternatively, the databases 402A-402C can be included in a single data store, such as data store 102 of FIG. 1, or distributed across devices.

The client device 438 represents the same compute devices as the client devices 338 of FIG. 3. The client device 436 includes a browser 448, which represents an application to access the metric reports of the metric server 454. The client device 436 may also store the application 444. The client device 436 can download the application from an application store ("app store") 446 via an application portal 442 located on a web server, such as application server 450.

The instrumentation server 452 can retrieve an application 444 via the app portal 442. The application 444 can be instrumented via the instrumentation server 452. The instrumentation server 452 can include an instrument tool 440 to perform the instrumentation (e.g., inject program code for measurement retrieval) on the application 444. At the time of instrumentation, the public key can be extracted from the application via the extraction engine 416. The public key can be used to update a tenant profile with access to metrics of the application 444.

The action server 456 can receive the instrumented version of the application 444 can test or otherwise perform actions on the application to create measurements. Alternatively, the instrumented application 444 can be provided to the app store 448 (or the client device 436) to retrieve metrics from other devices. The testing tool 448 can test the application, such as by using a script.

As actions are performed on the instrumented application 444, measurements can be received by the metrics server 454 to be maintained in the metrics database 402C. The client device 438 can then access the system 400 to retrieve a metric from the metrics server 454 consistent with the description and examples described herein. The system 400 operating in the environment 490 can facilitate, based on criteria, automatic downloading, instrumentation, and testing of an application 444 to create metrics and/or metric reports available for a user to consume when the user is able to provide a certificate associated with the certified signature of the application 444 when uploaded to the app store 448. The metric reports can be retrieved from the metrics server 484. For example, a user can retrieve a metric report for the application 444 via the browser 448 of the client device 438 or via the app portal 442 provided by the application server 450.

FIG. 5 depicts example modules used to implement example systems for regulating access to a metrics report. Referring to FIG. 5, the example modules of FIG. 5 generally include a security module 592, a tenant module 504, a metrics module 508, and an interface module 594. The example modules of FIG. 5 can be implemented on compute devices such as service devices 334 of FIG. 3 and the metrics server 454 of FIG. 4.

The security module 592 represents program instructions that when executed by a processor resource cause the processor resource to analyze a certificate for authorization. For example, a processor resource executing the security module 592 can receive a request 588 to provide a metrics report the processor resource can use a certificate 570 to authenticate the request and identify the tenant of the request. The security module 592 can include program instructions, such as an authentication module 510 and an identification module 512, to facilitate authenticating the request 588 and identifying the tenant. The authentication module 510 and identification module 512 represents the same program instructions as the authentication module 210 and the identification module 212 of FIG. 2. The security module 592 can receive a signature 572 of the application of the request 568 to maintain a tenant profile based on a public key of the signature 572 for an application associated with the request 568.

The tenant module 504 can represent the same program instructions as the tenant module 204 of FIG. 2. The tenant module 504 can cause a processor resource to receive a tenant profile 574 based on the authentication and identification performed by the processor resource that executed the security module 592. For example, the tenant module 504 can include program instructions, such as an add module 584, to facilitate maintenance of the tenant profile 574. For example, the add module 584 can represent program instructions that when executed by a processor resource can cause the processor resource to add an application to the tenant profile 574 when the certificate 570 of the application is associated with a tenant of the system that is the owner of the same public key of the certificate 570.

The metrics module 506 can represent the same program instructions as the metrics module 208 of FIG. 2. The metrics module 506 can include program instructions (such as an authorization module 586, an app module 588, and a database module 590) to facilitate regulating access to the metric information. The authorization module 586 represents program instructions that when executed by a processor resource can cause the processor resource to receive a certificate 570 and authenticate the request 588 to access the metrics based on the certificate 570. Once the request 568, is confirmed to be authorized, a list of applications 576 can be retrieved for which the tenant has authorization based on the tenant profile 574 associated with the certificate 570. The database module 590, when executed, can cause a processor resource to access a database at a database location 578 to retrieve authorized metrics of the applications of the list of applications.

The list of applications and/or the metrics associated with the list of applications can be provided to a processor resource executing the interface module 594. The interface module 594 represents program instructions that when executed by a processor resource cause the processor resource to provide metric information to a destination identified by the request, such as a user, a portal, or an application programming interface ("API"). The interface module 594 can include program instructions, such as a list module 514 and a report module 508, to facilitate providing the metric information. The report module 508 and the list module 514 can represent the same program instructions as the report module 208 and the list module 214 of FIG. 2. The list module 514, when executed, can cause a processor resource to prepare a list 576 of applications for selection of a metric report 582 associated with an application of the list 576. The report module 508, when executed, can cause a processor resource to prepare a metric reports 582 associated with an authorized application based on the metrics 580 retrieved from the metrics database. For example, the report module 508 can cause a processor resource to prepare a report 582 including a performance report and a user comment analysis based on the metrics 580. The report 582 can be made accessible to an authorized user via any appropriate communication method. For example, the report 582 can be provided upon signing into a website using HTTPS with the certificate stored with the browser, accessing an application with access to the certificate 570, or provided in a secured file that is revealed with the correct certificate.

Figure 6:
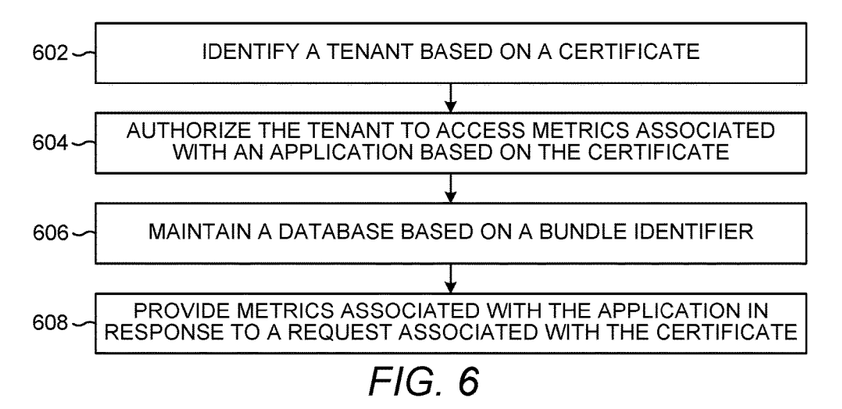
FIGS. 6-8 are flow diagrams depicting example methods for regulating access to a metrics report.
Figure 7:
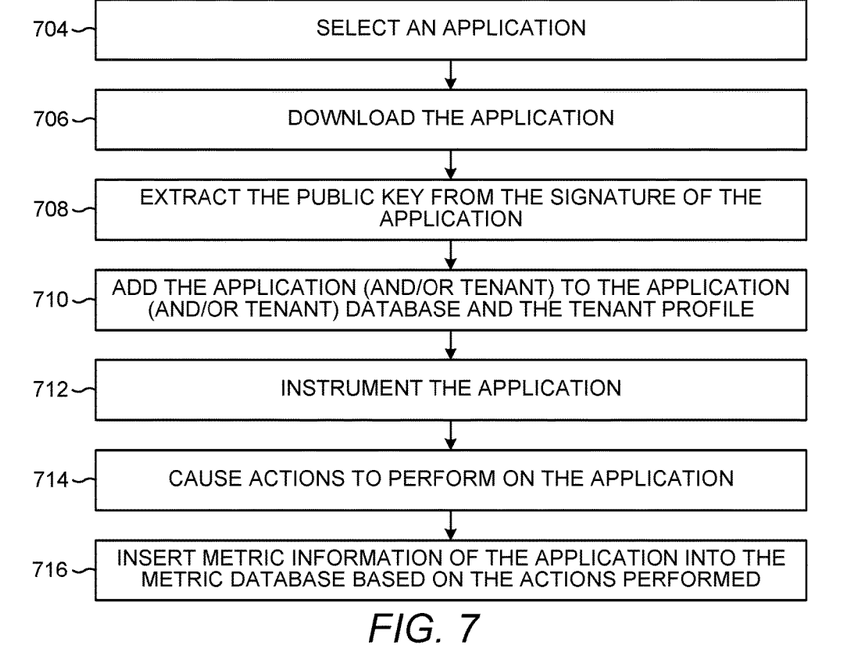
Figure 8:
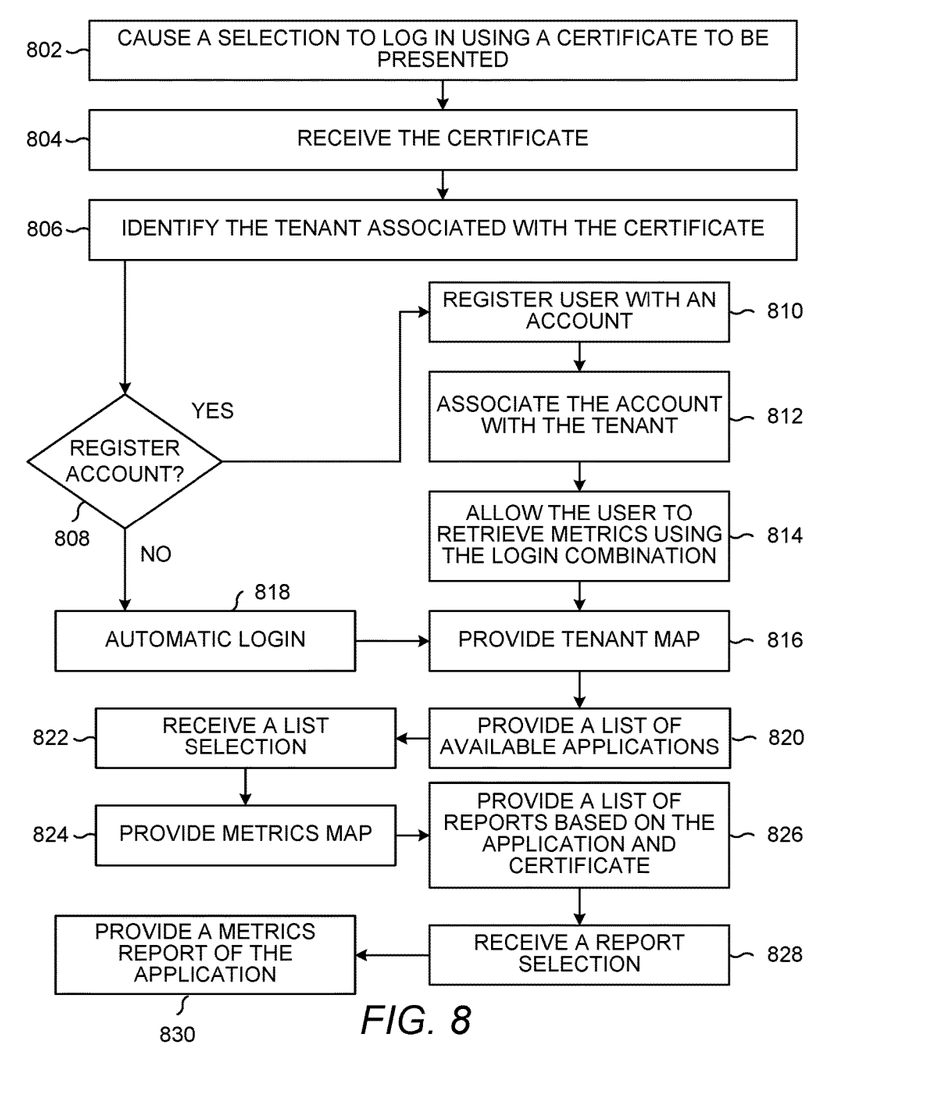

FIGS. 6-8 are flow diagrams depicting example methods for regulating access to a metrics report. Referring to FIG. 6, example methods for regulating access to a metrics report can generally comprise identifying a tenant to which a user belongs based on a certificate, authorizing the tenant to access metrics associated with an application, maintain a database of metrics based on a bundle identifier, and providing metrics associated with the application.

At block 802, a tenant is identified based on a certificate. The certificate can be provided by a user, used to authenticate the user belongs to a tenant, and provide a tenant profile of the tenant. For example, the user can provide the certificate via a browser, such as browser 448 of FIG. 4, using a standard HTTPS communication where a client certificate is requested as part of a handshake (e.g., an agreed form of communication based on a protocol) such as the handshake feature of SSL/TLS protocols. The tenant is authorized to access metrics associated with an application of the tenant profile based on the certificate at block 604. For example, the certificate can be compared to a public key associated with a private key used to sign an application of the tenant profile.

At block 606, a database is maintained based on a bundle identifier. The bundle identifier is used to organize a database of metrics and associate the metrics of an application with the application for when the owner (or authenticated user) wants to retrieve metrics related to the application. This is possible because both the bundle identifier and the private key are unique, one to the application and the other to the owner of the application. The private key identifies the tenant and can be used by the owner to sign multiple applications. The application can also be identified uniquely using the identifier pair of the bundle identifier and the public key. In this manner, metrics associated with the application can be provided in response to a request associated with a certificate derived from the private key at block 608. For example, the bundle identifier of an application can be identified and based on a public key of the signature of the application, a certificate compatible with the public key can authorize access to a request from a user associated with the certificate authorized to access the metrics of the application.

FIG. 7 includes blocks related to the blocks of FIG. 8. In particular, FIG. 7 depicts additional blocks and details generally regarding selecting an application for instrumentation, downloading the application, extracting the public key of the application, adding the application to the tenant profile, instrumenting an application, causing actions to perform on the application, and inserting metric information of the application into the metric database based on the actions performed.

At block 704, an application is selected. An application can be selected based on a criteria (such as an organization, developer, or application category). For example, an application can be searched for in an app store based the criteria. Alternatively, an application can be selected at random. Once the application is selected, the application (including an application file) is downloaded at block 708. At block 708, the public key is extracted from the signature of the downloaded application file of the selected application.

At block 710, an application is added to the application database and the tenant profile of the appropriate tenant. The application database can correlate data between the application and the metrics. The public key can be used to identify the appropriate tenant, such as the tenant profile associated with a certificate associated with the public key. If the tenant does not already exist, a new tenant can be created and the application can be added to the newly created tenant profile.

At block 712, the application downloaded at block 706 is instrumented. For example, the application can be injected with program code at every function to provide a point to evaluate performance of the application. The application can be instrumented with program code to send metric information to the metrics database. Actions can be caused to be performed on the application to create metric information at block 714. At block 716, the metric information of the application is inserted into the metrics database. The metric information can be inserted in the metrics database with the bundle identifier (and/or public key) or in a way to identify the metric information is associated with the bundle identifier (and/or public key). With the metric database filled with metric information of a plurality of applications, the metric database is prepared for access by a user to retrieve a metrics report based on the metric information in the metric database.

FIG. 8 depicts an example flow diagram depicting example methods for regulating access to a metrics report. Referring to FIG. 8, example methods for regulating access to a metrics report can generally comprise receiving a certificate, identifying the tenant associated with the user, registering an account or automatically logging in based on the certificate, providing a list of applications and a list of reports, and providing a report based on the application and/or report selection.

At block 802, a selection to log in using a certificate is caused to be presented. For example, a user can select to log in using a certificate or log in using a registered account via a login combination of a username and password. A certificate is received at block 804 and the tenant associated with the certificate is identified at block 808. Whether an account is to be registered is determined at block 808. If the user providing the certificate is registered with an account or if the user declines to register an account, the system can automatically log in the user at block 818 to an account with access to metrics associated with applications based on the certificate (e.g., applications for which the certificate contains a public key associated with the private keys used to sign the applications when uploaded to an app store).

After logging into the tenant account (i.e., account associated with the tenant profile) using the certificate, the user can be allowed to register a username and password combination (discussed as "account credentials" and "login combination" herein) at block 810 that can be used later to log into the tenant account as an alternative to logging in via a certificate, if the user desires to do so. At block 812, the account credentials can be associated with the tenant profile. For example, the certificate can be associated with an account having a login combination for the user when the certificate exists in the second database (e.g., the tenant profile already exists) and the login combination is provided with the certificate. At block 814, the system can allow the user to retrieve metrics using the login combination at a later time without the certificate. For example, a user can be allowed to retrieve metrics using a login combination when the login combination is associated with a certificate authorized to access the metrics of the metrics database. Allowing a user, such as an application owner, to retrieve application metrics without requiring additional account information to be entered can improve convenience of instrumentation and secure unauthorized users from viewing the metrics targeted for the owner of the application by using a certificate.

After logging in the user, a tenant map is provided at block 816. A tenant map is a map between the tenant and a plurality of applications defined for the tenant, such as an associative array. The tenant map can be part of a tenant profile and/or a tenant database, such as tenant database 402A of FIG. 4. A list of available applications is provided at block 820. For example, the user can receive a list of applications based on the tenant map and allowed to select one of the applications of the list of applications. A list selection is received at block 822 to identify an application of which a metric report is desired. In response to the list selection, a metrics map can be provided at block 824. The metrics map is a map between the application and the metrics of the application authorized for access by the tenant associated with the certificate. For example, based on user information of the certificate, a user may be restricted from accessing a report (and, therefore, restricted from accessing certain metrics of the metrics database). Each application or combination of applications can include a number of reports available to retrieve. Once a report is selected, the report selection can be received by the system at block 822. In response to the report selection, at block 828, a metrics report of the application is provided. As mentioned above, the level of report details can be restricted based on the level of authorization identified based on the certificate (e.g., based on the user information of the certificate).

Although the flow diagrams of FIGS. 5-8 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

The present description has been shown and described with reference to the foregoing examples, it is understood, however, that other forms, details, and examples may be made without departing from the spirit and scope of the following claims.

What is claimed is:

1. A system comprising:
   a processor resource; and
   a memory resource on which is stored instructions that are to cause the processor resource to:
     maintain a plurality of tenant profiles with access to a first set of metrics of a plurality of metrics based on authorization via a certificate, the first set of metrics associated with a first application of a plurality of applications based on a bundle identifier associated with the first application and being performance statistics of the first application derived from instrumentation of the first application;
     maintain the plurality of metrics, the first set of metrics being stored based on a public key associated with a private key used to sign the first application; and
     provide the first set of metrics associated with the first application in response to a report request when the report request is from a user associated with a first tenant profile of the plurality of tenant profiles and the first tenant profile is authorized to access the first set of metrics based on the certificate associated with a private key used to sign the first application.

2. The system of claim 1, wherein the instructions are further to cause the processor resource to:
   receive the certificate containing the public key and user information;
   identify the tenant profile of a tenant authorized by the certificate; and
   provide the plurality of applications associated with the tenant when the tenant is authenticated via the certificate.

3. The system of claim 2, wherein the certificate is derived from a combination of the public key and the user information and wherein the instructions are further to cause the processor resource to:
   authorize the user to retrieve the first set of metrics based on the user information of the certificate.

4. The system of claim 2, wherein the instructions are further to cause the processor resource to:
   extract the public key from the signature of the first application; and
   instrument the application based on the bundle identifier.

5. The system of claim 1, comprising:
   a tenant database comprising a tenant registration for automatic identification of the tenant based on the public key;
   an application database comprising a first map between the tenant and an application signed by the private key associated with the tenant; and
   a metrics database comprising a second map between the plurality of metrics and the plurality of applications.

6. A non-transitory computer readable storage medium comprising a set of instructions executable by a processor resource to:
   maintain a first database of metrics based on application information captured via instrumentation of a first application of a plurality of applications, the first database to be organized based on the plurality of applications;
   receive a report request for a set of metrics associated with the first application from a tenant authorized to access the set of metrics based on a comparison between a certificate of the tenant and the private key used to sign the first application, wherein the set of metrics is stored based on a public key associated with the private key used to sign the first application and are performance statistics of the first application derived from instrumentation of the first application; and
   provide the set of metrics from the first database when the certificate derived from the private key used to sign the application identifies the tenant with authorization to access the set of metrics, the set of metrics to be organized based on the application.

7. The medium of claim 6, wherein the set of instructions is executable by the processor resource to:
   extract the public key from the signature of the application, the signature available from an application file when the application is downloaded; and
   add the tenant and the application to a second database when the database does not include the public key, the second database to include a map of applications to tenants.

8. The medium of claim 6, wherein the set of instructions is executable by the processor resource to:
   instrument the application with instrumentation code to cause the processor resource to generate measurements of the application;
   cause actions to perform on the application to cause the instrumentation code to generate the measurements; and
   store the measurements associated with the application in the first database based on the bundle identifier and the instrumentation code.

9. The medium of claim 8, wherein the set of instructions is executable by the processor resource to:
   generate a report based on the metrics of the first database associated with the application and authorized for view by the tenant, the report containing information associated with at least one of user comment analysis, performance, stability, usability, static code analysis, and security analysis.

10. The medium of claim 6, wherein the set of instructions is executable by the processor resource to:
    receive the certificate from a user via secure hypertext transfer protocol, the certificate to include the public key associated with the private key used to sign the application.

11. A method for regulating access to a metrics report comprising:
    identifying a tenant to which a user belongs based on a certificate;
    authorizing the tenant to access metrics associated with an application based on a comparison of the certificate to a public key associated with a private key used to sign the application, wherein the metrics are stored based on the public key associated with the private key used to sign the application and are performance statistics of the application derived from instrumentation of the application;

maintaining a first database of metrics based on a bundle identifier, the bundle identifier being unique to the application; and providing metrics associated with the application from the first database using the bundle identifier in response to a request from a user associated with the certificate authorized to access the metrics of the application.

12. The method of claim 11, comprising:

extracting the public key from a signature of an application file of the application; and adding the application to a tenant profile associated with the certificate to a second database, the second database to correlate data with the first database based on the application.

13. The method of claim 12, comprising:

associating the certificate with an account having a login combination for the user when the certificate exists in the second database and the login combination is provided with the certificate;

automatically logging in the user to the account based on the certificate; and allowing the user to retrieve metrics using the login combination when the login combination is associated with the certificate authorized to access the metrics of the first database.

14. The method of claim 11, comprising:

selecting the application from a store based on a criteria;

downloading an application file associated with the application;

instrumenting the application with program code to send metric information to the first database; and inserting the metric information of the application into the first database.

15. The method of claim 11, comprising:

providing a first map between the tenant and a plurality of applications defined for the tenant, the application being one of the plurality of applications; and providing a second map between the application and the metrics of the application authorized for access by the tenant associated with the certificate.

* * * * *